(12) United States Patent
Ren et al.

(10) Patent No.: US 12,002,453 B2
(45) Date of Patent: Jun. 4, 2024

(54) METHODS AND DEVICES FOR IRREGULAR PRUNING FOR AUTOMATIC SPEECH RECOGNITION

(71) Applicant: KWAI INC., Palo Alto, CA (US)

(72) Inventors: Yongxiong Ren, San Jose, CA (US); Bingbing Li, Stafford Spring, CT (US); Yang Liu, San Jose, CA (US); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 218 days.

(21) Appl. No.: 17/213,010

(22) Filed: Mar. 25, 2021

(65) Prior Publication Data

US 2022/0310069 A1  Sep. 29, 2022

(51) Int. Cl.
*G10L 15/16* (2006.01)
*G06N 3/082* (2023.01)
*G10L 25/30* (2013.01)

(52) U.S. Cl.
CPC .............. *G10L 15/16* (2013.01); *G06N 3/082* (2013.01); *G10L 25/30* (2013.01)

(58) Field of Classification Search
CPC ......... G10L 15/16; G10L 25/30; G10L 15/28; G06N 3/082
See application file for complete search history.

(56) References Cited

U.S. PATENT DOCUMENTS 10,719,764 B2    7/2020  Shazeer et al.
2018/0039883 A1*  2/2018  Kurata ................... G06N 3/084
2018/0204111 A1*  7/2018  Zadeh .................. G06V 10/764
2019/0087729 A1*  3/2019  Byun ..................... G06N 3/045
2019/0130271 A1   5/2019  Narang et al.
2020/0082264 A1*  3/2020  Guo ........................ G06N 3/084
2020/0167654 A1*  5/2020  Guo ........................ G06N 3/063
(Continued)

FOREIGN PATENT DOCUMENTS

CN          109726045 A       5/2019

OTHER PUBLICATIONS

Vaswani, Ashish et al., "Attention Is All You Need" Computation and Language (cs.CL); Machine Learning (cs.LG), arXiv: 1706.03762, https://doi.org/10.48550/arXiv.1706.03762, (15p).
(Continued)

*Primary Examiner* — Michael N Opsasnick
(74) *Attorney, Agent, or Firm* — Arch & Lake LLP

(57) ABSTRACT

A method and an apparatus for automatic speech recognition are provided. The method includes: generating a weight matrix for a layer of a plurality of layers in a neural network; dividing the weight matrix into a plurality of blocks, each block including a plurality of weights; selecting a pre-determined percentage of weights from at least one block for block-wise pruning; and generating a block-wise pruned weight matrix by setting the pre-determined percentage of weights selected from the at least one block to zero. The weight matrix includes a set of weights associated with the layer, the plurality of layers includes a first layer receiving a first input associated with one or more audio feature sequences, and the plurality of layers are executed on one or more processors. The method efficiently accelerates model inference using irregular pruning.

20 Claims, 9 Drawing Sheets

(56) References Cited

U.S. PATENT DOCUMENTS

| | | | | |
|---|---|---|---|---|
| 2020/0184278 | A1* | 6/2020 | Zadeh | G06N 3/044 |
| 2020/0201642 | A1* | 6/2020 | Dupont de Dinechin | G06F 9/30145 |
| 2021/0064987 | A1* | 3/2021 | Springer | G06F 17/153 |
| 2021/0081781 | A1* | 3/2021 | Tanizawa | G06N 3/08 |
| 2021/0304356 | A1* | 9/2021 | Delattre | A63F 13/53 |
| 2021/0326693 | A1* | 10/2021 | Kumar | G06N 3/04 |
| 2021/0387643 | A1* | 12/2021 | Hari | B60W 30/095 |
| 2022/0036189 | A1* | 2/2022 | Courville | G06N 3/082 |
| 2022/0172052 | A1* | 6/2022 | Bunandar | G06N 3/084 |

OTHER PUBLICATIONS

Gulati, Anmol, et al., "Conformer: Convolution-augmented Transformer for Speech Recognition", Google Inc., May 16, 2020, (5p).

Zhao, Yuanyuan, et al. "The Speechtransformer For Large-Scale Mandarin Chinese Speech Recognition", IEEE Xplore, Nov. 4, 2020, (5p).

Zhang, Tianyun et al., "A Systematic DNN Weight Pruning Framework using Alternating Direction Method of Multipliers", ECCV 2018 SpringerLink: https://link.springer.com/conference/eccv, (16p).

Zhang, Tianyun et al., "A Unified DNN Weight Compression Framework Using Reweighted Optimization Methods", Apr. 12, 2020, (9p).

NVIDIA DeepLearningExamples, (22p).

Narang, Sharan et al., "Block-Sparse Recurrent Neural Networks", Nov. 8, 2017 (12p).

* cited by examiner $W_{8\times8}$

| $WB_{11}$ | $WB_{12}$ |
| $WB_{21}$ | $WB_{22}$ |
| $WB_{31}$ | $WB_{32}$ |
| $WB_{41}$ | $WB_{42}$ |
| $WB_{51}$ | $WB_{52}$ |
| $WB_{61}$ | $WB_{62}$ |
| $WB_{71}$ | $WB_{72}$ |
| $WB_{81}$ | $WB_{82}$ |

FIG. 4

$W_{8\times8}$

| $WB_{11}$ | $WB_{12}$ |
| $WB_{21}$ | $WB_{22}$ |
| $WB_{31}$ | $WB_{32}$ |
| $WB_{41}$ | $WB_{42}$ |
| $WB_{51}$ | $WB_{52}$ |
| $WB_{61}$ | $WB_{62}$ |
| $WB_{71}$ | $WB_{72}$ |
| $WB_{81}$ | $WB_{82}$ |

FIG. 5

METHODS AND DEVICES FOR IRREGULAR PRUNING FOR AUTOMATIC SPEECH RECOGNITION

FIELD

The present application generally relates to automatic speech recognition (ASR), and in particular but not limited to, an irregular pruning method for ASR model acceleration and related hardware devices.

BACKGROUND

ASR which allows the derivation of the transcription (word sequence) of an utterance given the speech waveform, has found its importance in many service applications, such as voice transcription, audio search, content review, and live streaming. One of important ASR approaches is to use an attention-mechanism based transformer model, namely speech transformer, which predicts word sequence by capturing long-term dependencies and wide-range context information. It may outperform the previously de facto ASR choice, i.e., recurrent neural networks that can model the temporal dependencies in the audio sequence effectively. It may also outperform convolutional neural network (CNN) based models.

While the speech transformer has achieved excellent word/character error rate performance for both English and Chinese ASR and is good at modeling long-range global context, it is less capable to extract fine-grained local feature patterns. CNN models, on the other hand, exploit local information and are used as the de-facto computational block in vision. They learn shared position-based kernels over a local window, thus maintaining translation equivariance and ability to capture features like edges and shapes. However, CNN models have limited capability in capturing dynamic global context.

A conformer model is built on the combination of convolution and self-attention, such that it may learn both pointwise local features and use content-based global interaction. A conformer model may show state-of-the-art performance in English ASR and may potentially outperform speech transformer in Chinese ASR. However, it requires significant amount of power and computation resources to process every audio corpus. There is a major technical challenge in real deployments to efficiently accelerate ASR conformer model on hardware devices, for example, graphic processing units (GPUs).

SUMMARY

This disclosure describes examples of techniques relating to accelerating a model inference based on irregular pruning methods.

According to a first aspect of the present disclosure, there is provided a method for ASR. The method includes generating a weight matrix for a layer of a plurality of layers in a neural network. The weight matrix includes a set of weights associated with the layer, the plurality of layers includes a first layer receiving a first input associated with one or more audio feature sequences, and the plurality of layers are executed on one or more processors.

The method further includes dividing the weight matrix into a plurality of blocks. Each block includes a plurality of weights. A pre-determined percentage of weights are selected from at least one block for block-wise pruning. Furthermore, the method includes generating a block-wise pruned weight matrix by setting the pre-determined percentage of weights selected from the at least one block to zero.

According to a second aspect of the present disclosure, there is provided an apparatus for ASR. The apparatus includes one or more processors and a memory configured to store instructions executable by the one or more processors. The one or more processors, upon execution of the instructions, are configured to generate a weight matrix for a layer of a plurality of layers in a neural network. The weight matrix includes a set of weights associated with the layer. The plurality of layers includes a first layer receiving a first input associated with one or more audio feature sequences, and the plurality of layers are executed on the one or more processors.

The one or more processors are further configured to divide the weight matrix into a plurality of blocks. Each block includes a plurality of weights. Further, a pre-determined percentage of weights are selected from at least one block for block-wise pruning. The one or more processors are further configured to generate a block-wise pruned weight matrix by setting the pre-determined percentage of weights selected from the at least one block to zero.

According to a third aspect of the present disclosure, there is provided a non-transitory computer readable storage medium, including instructions stored therein, where, upon execution of the instructions by one or more processors, the instructions cause the one or more processors to perform acts including: generating a weight matrix for a layer of a plurality of layers in a neural network. The weight matrix includes a set of weights associated with the layer, the plurality of layers includes a first layer receiving a first input associated with one or more audio feature sequences, and the plurality of layers are executed on the one or more processors.

The instructions cause the one or more processors to perform acts further including dividing the weight matrix into a plurality of blocks. Each block includes a plurality of weights. Further, a pre-determined percentage of weights are selected from at least one block for block-wise pruning. The instructions cause the one or more processors to perform acts further including generating a block-wise pruned weight matrix by setting the pre-determined percentage of weights selected from the at least one block to zero.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 4 illustrates dividing a weight matrix into a plurality of blocks according to the present disclosure.

FIG. 5 illustrates setting a pre-determined percentage of weights in each block to zero based on a heuristic algorithm according to the present disclosure.

DETAILED DESCRIPTION

Figure 1:
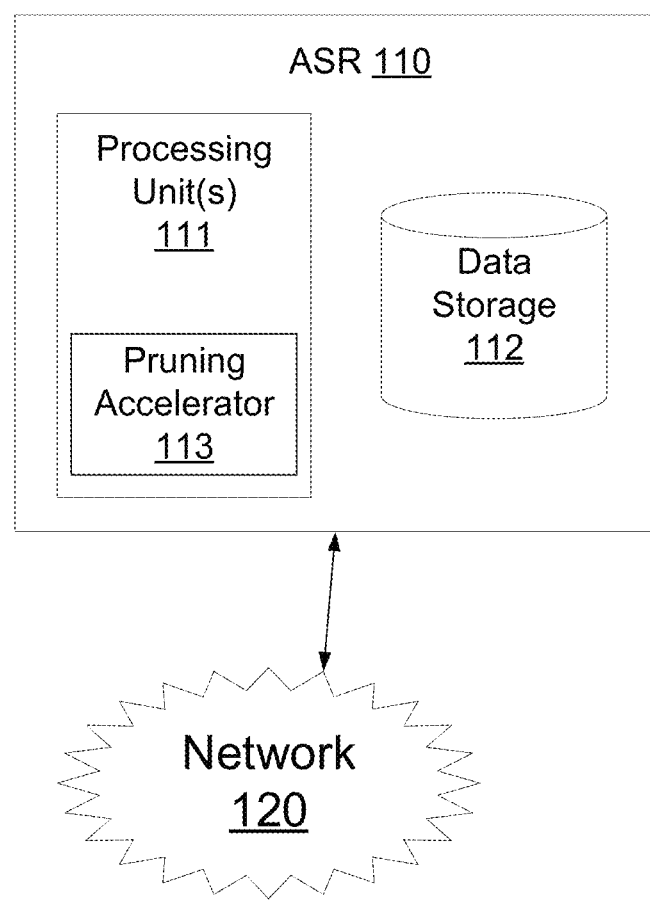
FIG. 1 illustrates an ASR system configured to implement one or more embodiments according to the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 illustrates an ASR system configured to implement one or more embodiments according to the present disclosure. As shown, the ASR system 110 is communicating with a network 120. The ASR system 110 may include one or more processing units 111 and one or more data storages 112. The one or more processing units 111 may include a pruning accelerator 113.

In some embodiments, the one or more processing units 111 may include any technically feasible hardware units configured to process data and execute software applications. For example, a processing unit may be any parallel computing platforms such as a GPU, Field Programmable Gate Arrays (FPGAs), a tensor processing unit (TPU).

In some embodiments, the pruning accelerator 113 prunes a neural network in a training process so that the overall complexity of the neural network is reduced, and the computational and memory requirements associated with the neural network are reduced. The pruning accelerator 113 may select the neurons to be pruned from the neuron network and deactivate the selected neurons. The pruning accelerator 113 may also deactivate any connections in the neural network to the selected neurons.

In some embodiments, the pruning accelerator 113 may consider constraints of hardware implementation during the pruning process and thus achieve inference acceleration of the pruned model on the actual hardware platform. In some embodiments, the pruning accelerator 113 may add constraints to the pruning structure by using a heuristic algorithm and adjust GPU calculation pipeline accordingly.

In some embodiments, the one or more data storages 112 may store training data and/or parameters related to training and/or pruning the neural network. The parameters may be used by the pruning accelerator 113 during the pruning of the neural network. The parameters may include, but not limited to, weights of each layer of the neural network, number of neurons of each layer of the neural networks, etc.

The network 120 may be any type of communications network, such as a local area network (e.g., intranet), wide area network (e.g., Internet), or some combination thereof and can include any number of wired or wireless links. Communication over the network 120 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some embodiments, the neural network may include a plurality of layers. For example, the neural network may include N layers including layer $L_1$, layer $L_2$, ..., layer $L_{N-1}$, and layer $L_N$. Each layer $L_n$ may be related to a weight matrix $W_n$, where n is a positive integer between 1 and N. In some embodiments, each layer $L_n$ may be initialized with an initial weight matrix $W_n$ by using a pre-determined algorithm which returns a matrix of random numbers drawn from a normal distribution with mean 0 and variance 1.

Figure 3:
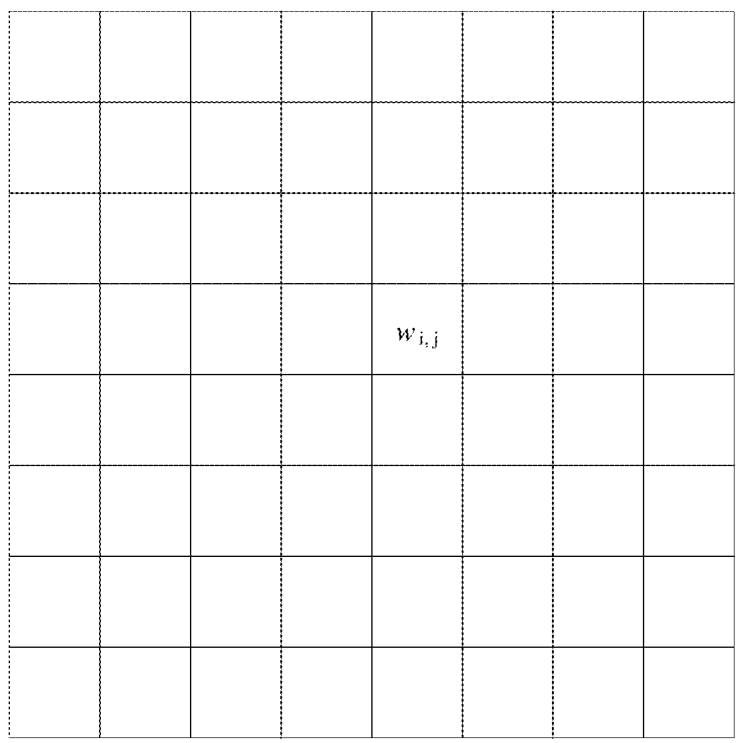
FIG. 3 illustrates a weight matrix associated with a layer in a neural network according to the present disclosure.

In some embodiments, the plurality of layers in the neural network may include one or more fully-connected (FC) layers. In an FC layer, weights related to the FC layer may be organized in a two-dimensional matrix. For example, the n-th layer $L_n$ is an FC layer and its weight matrix may be denoted by $W_n$. In some embodiments, the weight matrix $W_n$ of the n-th layer $L_n$ may include a plurality of rows and a plurality of columns. The number of rows may be denoted by y and the number of columns may be denoted by x, where y and x are positive integers. Thus, the weight matrix $W_n$ is a matrix of a dimension of x×y. The number of columns x equals to the number of neurons included in the layer $L_n$. The number of rows y may equal to the number of neurons included in the layer $L_{n+1}$ that subsequently follows the layer $L_n$. FIG. 3 illustrates a weight matrix associated with a layer in a neural network according to the present disclosure. A matrix element denoted as $w_{i,j}$ indicates a weight associated with a layer.

In some embodiments, the plurality of layers in the neural network may include one or more convolutional layers. In a convolutional layer, weights may be organized in a three-dimensional tensor. The size of the three-dimensional weight tensor may be related to a size of a filter/kernel in the convolutional layer, channel of an input image, etc. For example, the n-th layer $L_n$ is a convolutional layer and its weight tensor may be denoted by $T_n$. The convolutional layer $L_n$ may have a plurality of kernels. For example, the number of kernels that are included in the convolutional layer $L_n$ is k, where k is a positive integer. The width of every kernel is d, and the depth of every kernel or the number of channels of the input image is p. In some embodiments, the three-dimensional weight tensor $T_n$ of the convolutional layer $L_n$ may have a size of $d^2 \times p \times k$, where k, d, and p are respectively positive integers.

Figure 8:
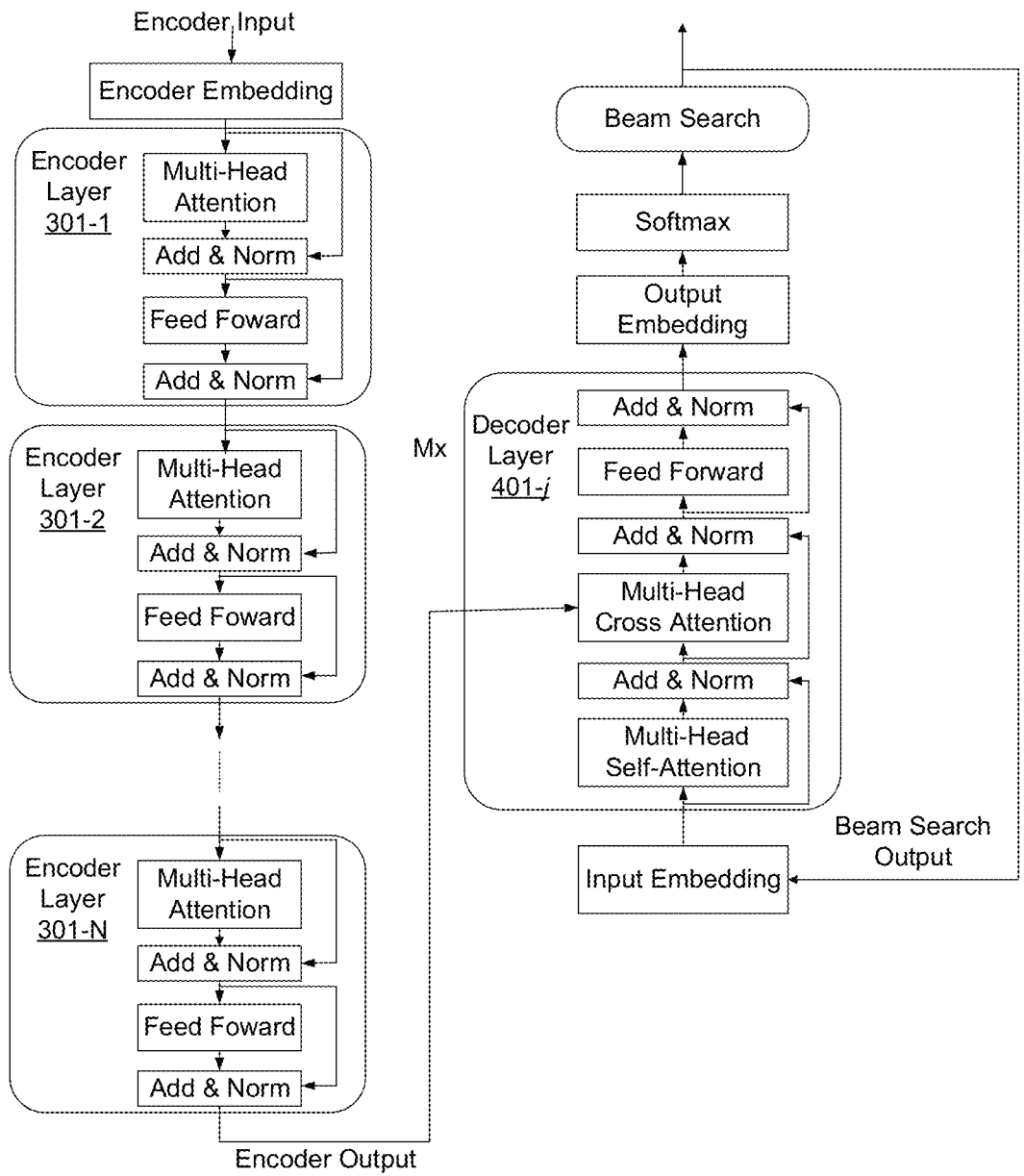
FIG. 8 illustrates a speech transformer according to the present disclosure.

In some embodiments, the neural network may use a transformer architecture, as shown in FIG. 8. FIG. 8 illustrates a speech transformer model according to the present disclosure. The transformer may include an encoder and a decoder. The encoder may include a plurality of encoder layers (301-1, 301-2, . . . , 301-N) and the decoder may include a plurality of decoder layers 401-j, where j may be a positive integer between 1 and M, and M and N are positive integers. Each of the encoder layers and each of the decoder layers may respectively include a plurality of FC layers. As shown in FIG. 8, each encoder layer may include a multi-head module having multiple FC layers. Each encoder layer may also include a feed forward module having multiple FC layers. Each encoder layer may also include multiple add & norm layers. Each decoder layer may also include a multi-head cross attention module, a multi-head self-attention module, a feed forward module, and a plurality of add & norm layers. These modules may respectively further include multiple FC layers. Each of these FC layers may be associated with a weight matrix.

Figure 9:
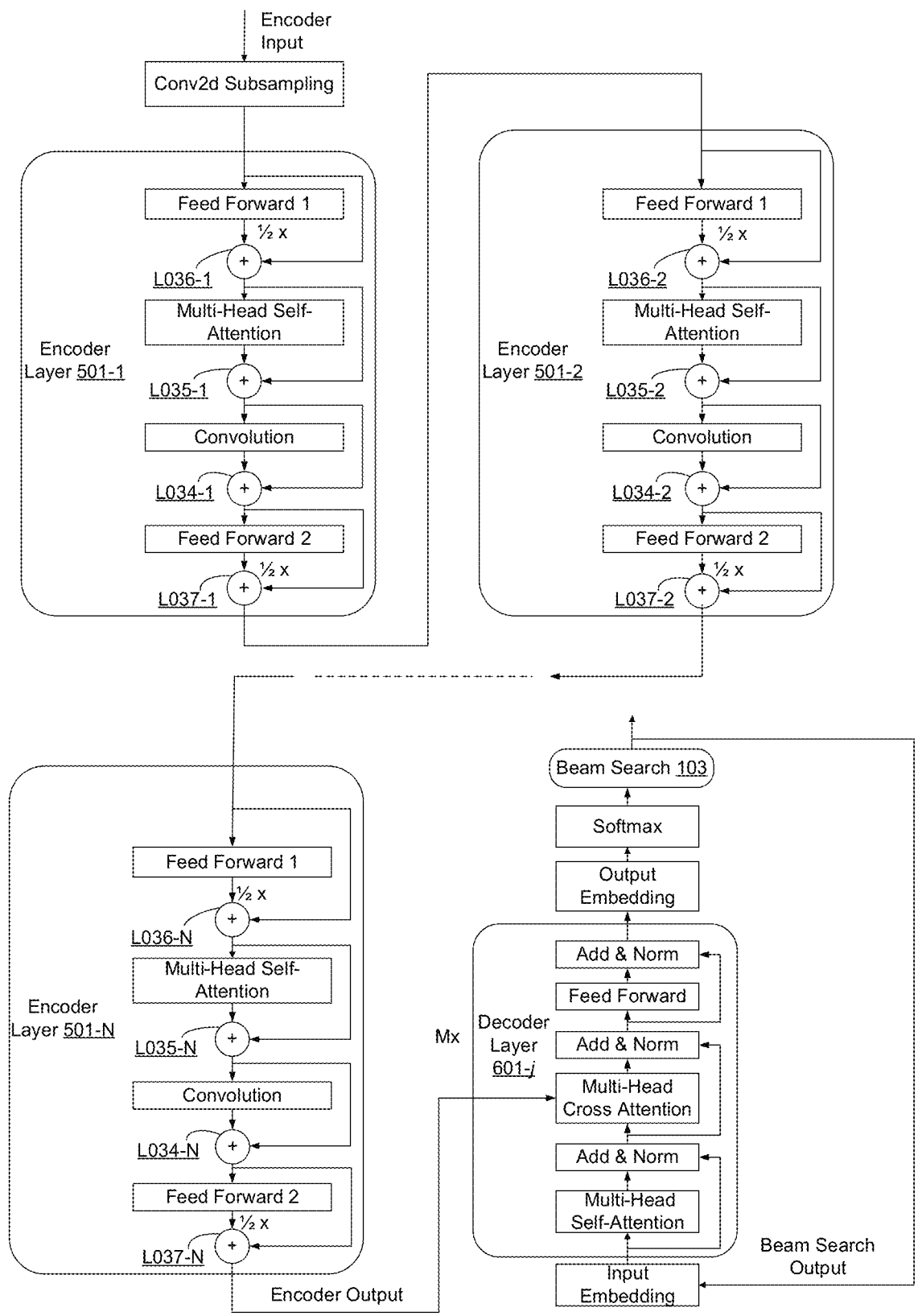
FIG. 9 illustrates a speech conformer according to the present disclosure.

In some embodiments, the neural network may use a conformer architecture, as shown in FIG. 9. FIG. 9 illustrates a speech conformer model according to the present disclosure. The conformer may include an encoder and a decoder. The encoder may include a plurality of encoder layers (501-1, 501-2, . . . , 501-N) and the decoder may include a plurality of decoder layers 601-j, where j may be a positive integer between 1 and M, and M and N are positive integers. Each encoder layer 501-i (i is a positive integer between 1 and N) may include two feed forward modules, a multi-head self-attention module, and a convolution module, and a plurality of residual connections including L035-i, L034-i, L036-i, and L037-i. The convolution module may include a plurality of convolutional layers. Each of the plurality of convolutional layers may be associated with a three-dimensional weight tensor. The feed forward modules and the multi-head self-attention module may include a plurality of FC layers. Each of the plurality of FC layers may be associated with a two-dimensional weight matrix.

Further, each decoder layer 601-j may include a multi-head cross attention module, a multi-head self-attention module, a feed forward module, and a plurality of add & norm layers. These modules may respectively further include multiple FC layers. Each of these FC layers may be associated with a weight matrix.

In some embodiments, the plurality of encoder layers of the transformer or the conformer may be sequentially executed on one or more GPUs. The one or more audio feature sequences may be parallelly sent or fed to the first encoder layer. After the first encoder layer receives all the one or more audio feature sequences, a first encoder layer output is generated and sent to the next encoder layer. The next encoder layer receives the first encoder layer output, generates an intermediate encoder layer output and sends to a following encoder layer. As such, each intermediate encoder layer receives an output from a previous encoder layer and then sends a generated output to a following intermediate encoder layer. The last intermediate encoder layer sends its output to the last encoder layer and the last encoder layer generates an encoder output and sends the encoder output to a decoder layer.

Figure 10:
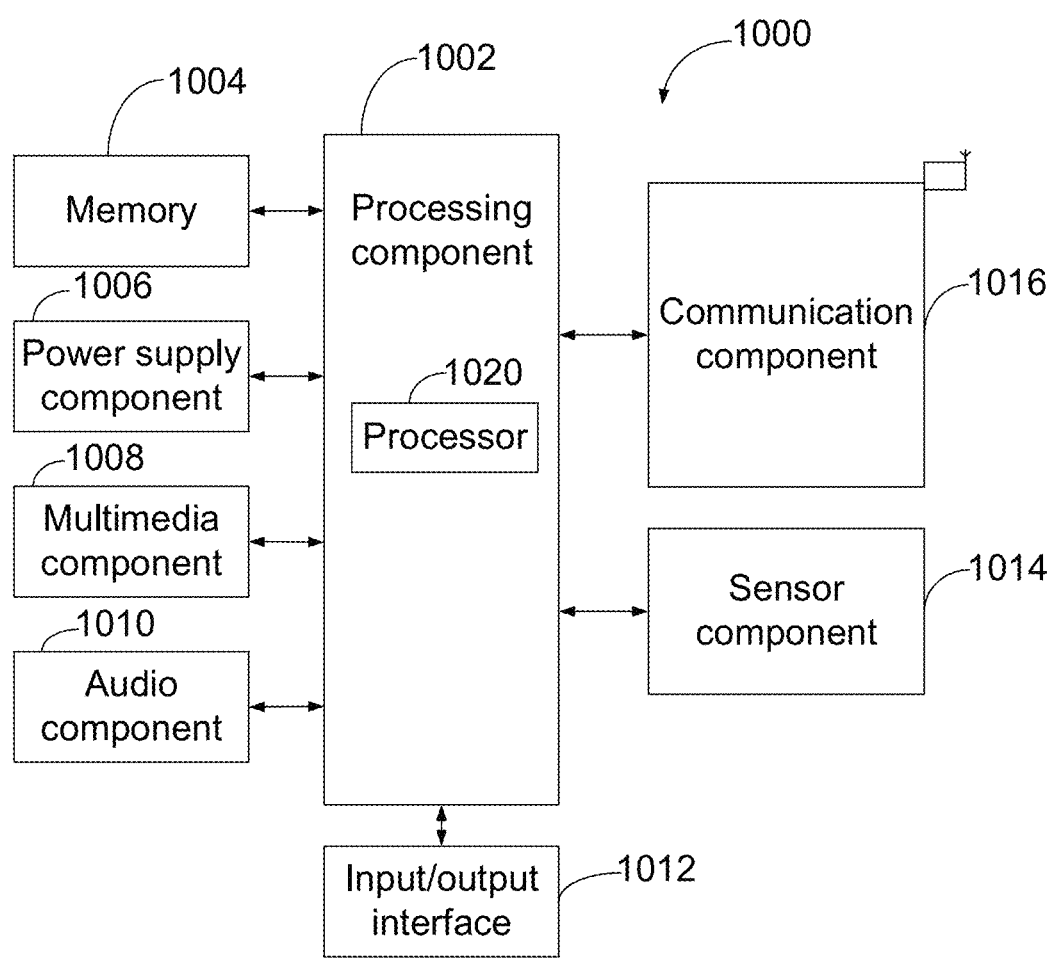
FIG. 10 is a block diagram illustrating an ASR system the present disclosure.

In some embodiments, the decoder of the transformer or the conformer processes a batch data in a step-by-step fashion. Each compute only output one symbol, that is, one word or character. For example, the first decoder layer calculates at a first time step t, and the next decoder layer, the second decoder layer then calculates at a second time step t+1, where t may indicate a time. For one time step, all the decoder sublayers will be calculated sequentially. As shown in FIGS. 9 and 10, the decoder layer output of the decoder layer is sent to a layer output embedding and a layer of softmax, and then sent to a beam search module including a plurality of layers.

In some embodiments, the pruning accelerator 113, as shown in FIG. 1, may prune weight matrices or tensors of a neural network in a training process so that the overall complexity of the neural network is reduced, and the computational and memory requirements associated with the neural network are reduced. In some embodiments, the block-wise pruning of the weight matrices may be implemented based on blocks. Block-wise weight pruning according to a tensor core size of one or more processors on which the neural network is implemented gains significantly in weight storage reduction and computation efficiency. In some embodiments, block-wise weight pruning according to the tensor core size is implemented by dividing a weight matrix into a plurality of blocks, selecting some weights from each block for block-pruning, and deactivating the selected weights in each block by setting the selected weights in each block to zero.

Figure 2:
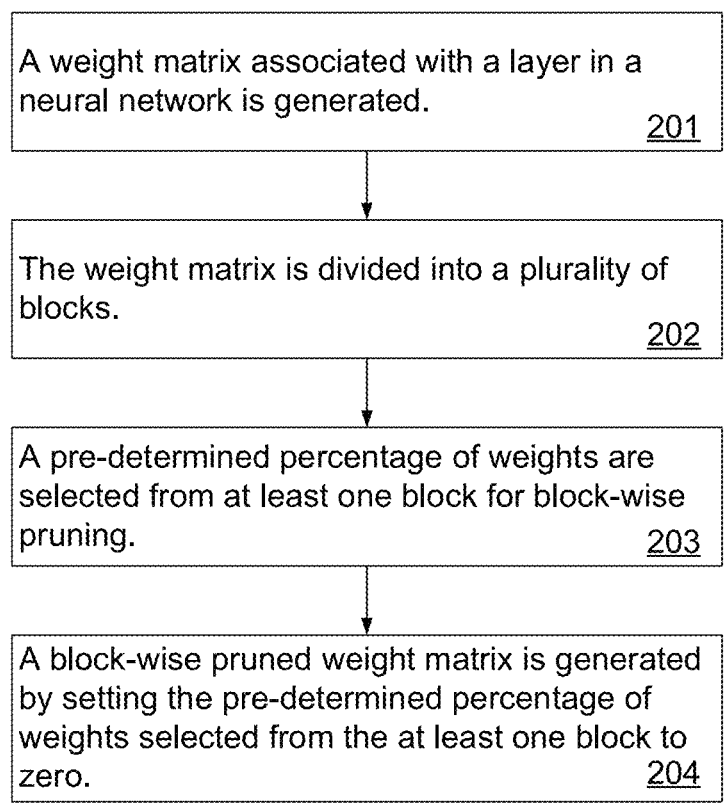
FIG. 2 is a flowchart illustrating an exemplary process of irregular block-wise pruning of a weight matrix according to the present disclosure.

FIG. 2 is a flowchart illustrating an exemplary process of irregular block-wise pruning of a weight matrix according to the present disclosure. As shown in FIG. 2, the method may include, but not limited to, the shown steps. The method of pruning may be implemented in a training process of the neural network to reduce parameter numbers of the neural network, so that the overall complexity of the neural network, and the computational and memory requirements associated with the neural network are reduced.

In step 201, a weight matrix associated with a layer in a neural network is generated. The neural network may include a plurality of layers. The layer to which the weight matrix is related is one layer of the plurality of layers. The plurality of layers may include convolutional layers, FC layers, attention layers, and etc.

In some embodiments, the weight matrix may include a plurality of rows and a plurality of columns. The number of rows may be denoted by y and the number of columns may be denoted by x, where y and x are positive integers. Thus, the weight matrix $W_n$ is a matrix of x×y. The number of columns x may equal to the number of neurons included in the layer $L_n$. The number of rows y may equal to the number of neurons included in the next layer $L_{n+1}$ that subsequently follows the layer $L_n$. Elements in the weight matrix $W_n$ respectively correspond to weight parameters of the layer $L_n$. As shown in FIG. 3, the weight matrix $W_{8\times8}$ is a matrix of 8×8, $w_{i,j}$ is one element of the weight matrix $W_{8\times8}$ at the position of row i and column j, and $w_{i,j}$ is corresponding to a weight parameter of the layer $L_n$. In some embodiments, the number of rows y and the number of columns x do not have to be the same as shown in FIG. 3.

In some embodiments, when a layer $L_n$ of the neural network is a convolutional layer, weights are organized initially as a three-dimensional weight tensor $T_n$. The step 201 may further include: transform the three-dimensional weight tensor $T_n$ to a two-dimensional weight matrix $W_n$ including a plurality of rows and a plurality of columns.

Figure 6:
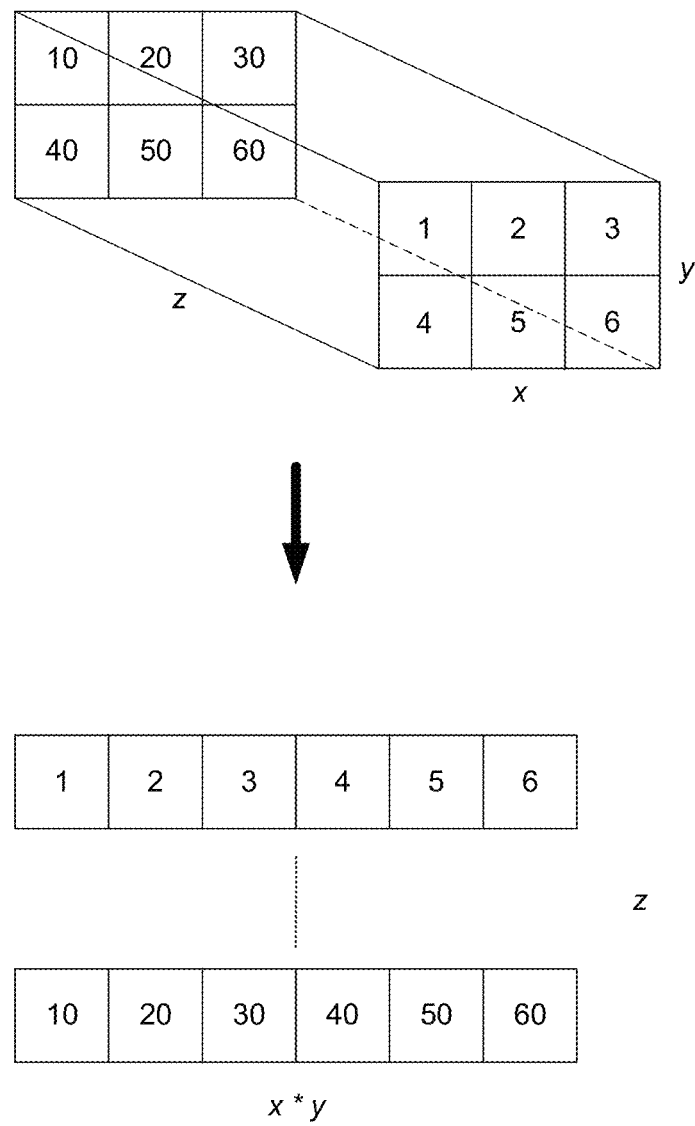
FIG. 6 illustrates a transformation from a three-dimensional weight tensor to a two-dimensional weight matrix according to the present disclosure.

FIG. 6 illustrates a transformation from a three-dimensional weight tensor to a two-dimensional weight matrix according to the present disclosure. The size of the three-dimensional weight tensor may be related to a size of a filter/kernel in the convolutional layer, channels of an input image, etc. As shown in FIG. 6, the three-dimensional weight tensor $T_n$ has a size of x×y×z, where x, y, and z are positive integers. In step 201, the three-dimensional weight tensor $T_n$ is transformed into a two-dimensional weight matrix $W_n$ having a size of (x×y)×z. The two-dimensional weight matrix $W_n$ includes z rows and (x×y) columns. The size of the three-dimensional weight tensor and the size of the two-dimensional weight matrix are not limited to the sizes illustrated in FIG. 6.

In some embodiments, x may be related to the width of every kernel included in the convolutional layer. For example, the width of every kernel is d and x equals to $d^2$. In some embodiments, y may be related to the depth of every kernel included in the convolutional layer or the number of channels of the input image. For example, the depth of every kernel is p and y equals to p. In some embodiments, z may be related to the number of kernels included in the convolutional layer. For example, the number of kernels included in the convolutional layer is k and z equals to k.

In step 202, the weight matrix is divided into a plurality of blocks.

In some embodiments, each block may include s columns and t rows, where s and t are positive integers, s is no greater than x, and t is no greater than y. Each block accordingly may include s×t weight parameters of the layer. In some embodiments, values of s and t are based on a tensor core size of one or more processors on which the layer is implemented. s and t may be same or different. In some embodiments, s may be 1 and t may be 4.

Figure 7:
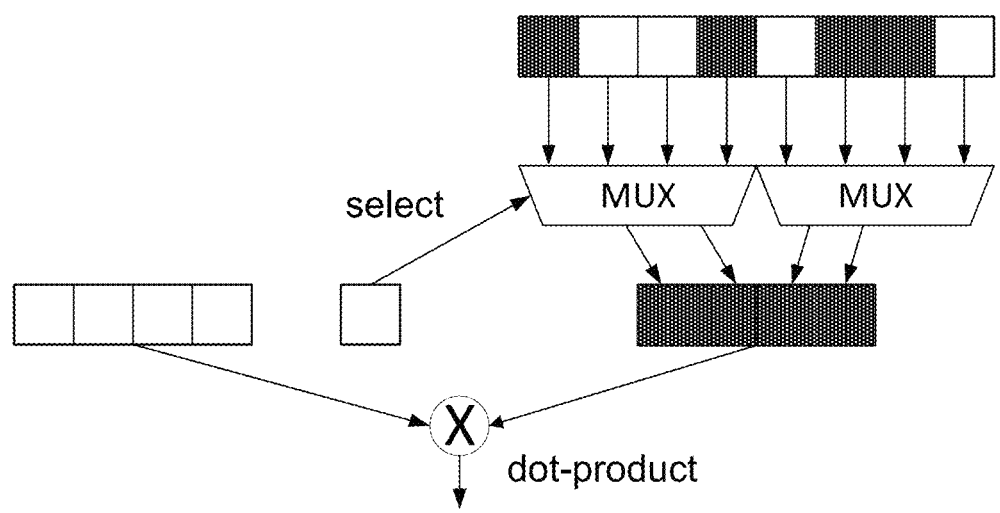
FIG. 7 illustrates training over tensor processing units according to the present disclosure.

In some embodiments, the determination of the size of each block is compatible with parallel computing platforms. For example, the size of each block is compatible with tensor core units in implementing matrix multiplication, as shown in FIG. 7. In some embodiments, the divided blocks may be directly computed/deployed on the tensor core units because the size of each block is compatible with the tensor core units.

In some embodiments, a user can determine the block size depending on the specific hardware accelerator that the model is being run on, e.g. 1×4 when the size of the tensor core units is 1×4, 2×2 when the size of the tensor core units is 2×2, etc.

As shown in FIG. 4, the weight matrix $W_{8\times8}$ is divided into a plurality of blocks $WB_{ij}$, where i and j are positive integers, i is between 1 and 2, and j is between 1 and 8. Each of the blocks $WB_{ij}$ has a size of 1×4 and include four weights/elements respectively corresponding to fours weight parameters of the layer. The plurality of blocks $WB_{ij}$ are accordingly organized in a matrix of 8×2 including elements $WB_{11}$, $WB_{12}$, ..., $WB_{82}$, as shown in FIG. 4.

Figure 11:
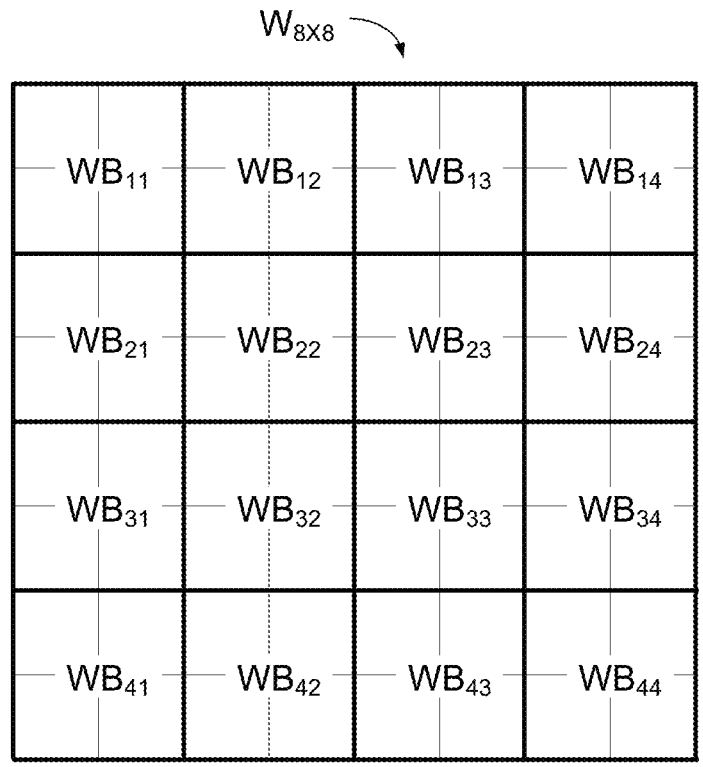
FIG. 11 illustrates dividing a weight matrix into a plurality of blocks according to the present disclosure.

As shown in FIG. 11, the weight matrix $W_{8\times8}$ is divided into a plurality of blocks $WB_{ij}$, where i and j are positive integers, i is between 1 and 4, and j is between 1 and 4. Each of the blocks $WB_{ij}$ has a size of 2×2 and include four weights/elements respectively corresponding to fours weight parameters of the layer. The plurality of blocks $WB_{ij}$ are accordingly organized in a 4×4 including elements $WB_{11}$, $WB_{12}$, ..., $WB_{44}$, as shown in FIG. 11.

In step 203, a pre-determined percentage of weights are selected from at least one block for block-wise pruning.

In some embodiments, the pre-determined percentage of weights are selected from each block for block-wise pruning.

In some embodiments, a user can determine the pre-determined percentage. The pre-determined percentage may be at least 50%. For example, the pre-determined percentage may be 50%, 60%, 75%, or 80%, etc.

In some embodiments, the pre-determined percentage of weights may be selected from each block based on a heuristic algorithm.

In step 204, a block-wise pruned weight matrix is generated by setting the pre-determined percentage of weights selected from the at least one block to zero.

In some embodiments, the block-wise pruned weight matrix is generated by setting the pre-determined percentage of weights selected from each block to zero.

FIG. 5 illustrates setting a pre-determined percentage of weights in each block to zero based on a heuristic algorithm according to the present disclosure. As shown in FIG. 5, the weight matrix $W_{8\times8}$ is divided into 16 blocks as explained in FIG. 4. Each block has a dimension of 1×4 and include four weights corresponding to weight parameters associated with a layer in the neural network. In FIG. 5, the pre-determined percentage is determined as 50%. Accordingly, in each 1×4 block, 2 weights out of total 4 weights are set to be zero. For example, in block $WB_{11}$, the right weight and the left weight are set to be zero while the two weights in the middle remain non-zero.

Figure 12:
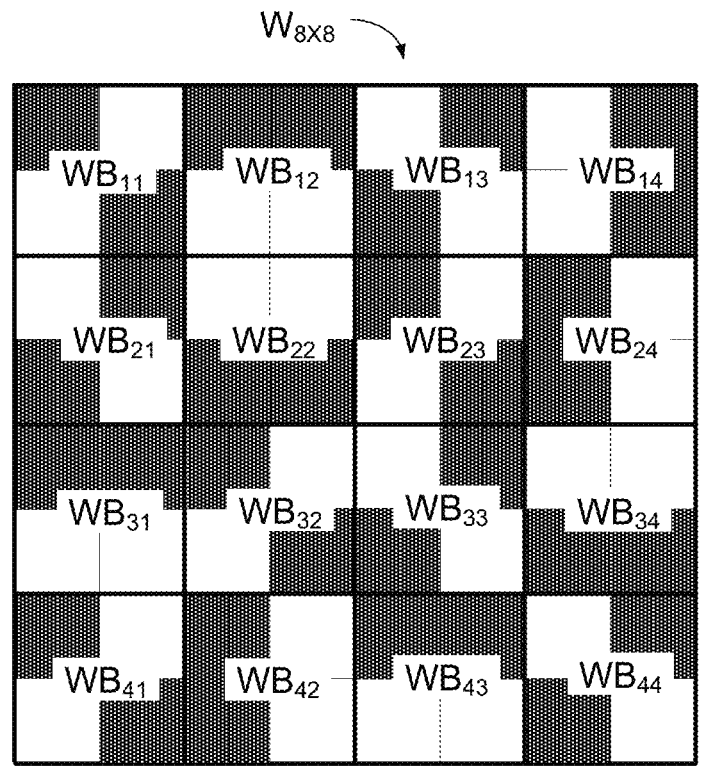
FIG. 12 illustrates setting a pre-determined percentage of weights in each block to zero based on a heuristic algorithm according to the present disclosure.

FIG. 12 illustrates setting a pre-determined percentage of weights in each block to zero based on a heuristic algorithm according to the present disclosure. As shown in FIG. 12, the weight matrix $W_{8\times8}$ is divided into 16 blocks as explained in FIG. 11. Each block has a dimension of 2×2 and include four weights corresponding to weight parameters associated with a layer in the neural network. In FIG. 12, the pre-determined percentage is determined as 50%. Accordingly, in each 2×2 block, 2 weights out of total 4 weights are set to be zero. For example, in block $WB_{11}$, the top right weight and the bottom left weight are set to be zero while the other two weights remain non-zero.

In some embodiments, in each block, the pre-determined percentage of weights are determined based on the heuristic algorithm. For example, the location of the two weights set to be zero in each block is determined based on the heuristic algorithm.

The present disclosure relates to a model inference acceleration algorithm based on the model compression method. By implementing model compression based on, for example, 50% sparsity, the compressed storage of the model is realized. In particular, methods are adopted based on heuristic regularization algorithms (such as alternating direction method of multipliers (ADMM), Reweighted L1 optimization algorithm, etc.) to achieve higher precision and higher compression ratio than direct compression. The whole training process consists of three steps including: 1) through hyperparameter finetuning, the model with the highest recognition accuracy for a specific data set is obtained; 2) the optimal sparse method of the model is obtained through heuristic regularization method; 3) based on the sparse model structure, through the re-adjustment and retraining of model parameters, a sparse optimal model is obtained. Additionally, by combining the Tensor core provided by NVIDIA Ampere GPU, the accelerated inference of the above-mentioned sparse model is realized. The disclosed method can effectively reduce the amount of data storage and can greatly improve the inference speed of the model. Further, the proposed method can be used in AI accelerators (including Nvidia Ampere GPU and other AI ASICs) that support hardware weight pruning to multiply the inference speed of the ASR transformer/conformer models.

Through the heuristic regularization method proposed, based on the pre-trained model, the optimal pruned model structure can be trained. Further, the model can be retrained through the pruned model structure to achieve higher prediction accuracy. Moreover, for the heuristic training phase, the expected sparsity of each layer can be directly specified, the regularization error between the current and the expected sparsity of the model parameters can be calculated, and the weights of training error and regularization to achieve an effective balance between the compression rate and accuracy of the final model can be gained. In addition, for the model retraining stage, the sparse model structure is first fixed, and the gradient obtained through backpropagation according to the sparse model structure is processed to ensure that the pruned weight parameters will not be updated and therefore the compression ratio of the model remains unchanged.

FIG. 10 is a block diagram illustrating an ASR system according to the present disclosure. The system 1000 may be a terminal, such as a mobile phone, a tablet computer, a digital broadcast terminal, a tablet device, or a personal digital assistant.

As shown in FIG. 10, the system 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the system 1000, such as operations relating to display, a telephone call, data communication, a camera operation and a recording operation. The processing component 1002 may include one or more processors 1020 for executing instructions to complete all or a part of steps of the above method. The processors 1020 may include CPU, GPU, DSP, or other processors. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the system 1000. Examples of such data include instructions, contact data, phonebook data, messages, pictures, videos, and so on for any application or method that operates on the system 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the system 1000. The power supply component 1006 may include a power supply management system, one or more power supplies, and other components associated with generating, managing and distributing power for the system 1000.

The multimedia component 1008 includes a screen providing an output interface between the system 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the system 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the system 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the system 1000. For example, the sensor component 1014 may detect an on/off state of the system 1000 and relative locations of components. For example, the components are a display and a keypad of the system 1000. The sensor component 1014 may also detect a position change of the system 1000 or a component of the system 1000, presence or absence of a contact of a user on the system 1000, an orientation or acceleration/deceleration of the system 1000, and a temperature change of system 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the system 1000 and other devices. The system 1000 may access a wireless network based on a communication standard, such as WiFi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

In some other examples, there is provided a non-transitory computer readable storage medium 1004, having instructions stored therein. When the instructions are executed by one or more processors 1020, the instructions cause the processor to perform a method as illustrated in FIG. 2.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for automatic speech recognition, comprising:
    receiving, by a first layer in a neural network that is executed on one or more processors, a first input associated with one or more audio feature sequences;
    generating a weight matrix for a layer of a plurality of layers in the neural network, wherein the weight matrix comprises a set of weights associated with the layer, the plurality of layers comprises the first layer receiving the first input, and the plurality of layers are executed on the one or more processors;
    dividing the weight matrix into a plurality of blocks, each block comprising a plurality of weights, wherein each block has an identical dimension and the identical dimension of each block that is obtained by dividing the weight matrix is determined according to a size of a tensor core unit of the one or more processors;
    determining a pre-determined percentage for each block, wherein the pre-determined percentage is X %, X is a positive integer;
    selecting, based on the pre-determined percentage, a sub-set of weights from the plurality of weights in each block for block-wise pruning, wherein a first ratio of a number of the sub-set of weights in each block to a number of the plurality of weights in each block is X %, wherein the sub-set of weights comprise at least one weight;
    setting the sub-set of weights in each block to zero to generate a block-wise pruned weight matrix, wherein other weights in each block remain non-zero, wherein a second ratio of a number of the other weights in each block to the number of the plurality of weights in each block is 1-X %; and
    generating, by the one or more processors, a final output for the one or more audio feature sequences based on the block-wise pruned weight matrix.

2. The method of claim 1, wherein the pre-determined percentage is at least 50%.

3. The method of claim 1, wherein the pre-determined percentage of weights are selected by using a heuristic regularization algorithm.

4. The method of claim 1, further comprising:
    determining, based on a heuristic regularization algorithm, the pre-determined percentage for each block.

5. The method of claim 4, wherein each block has a dimension of 1×4 or 2×2.

6. The method of claim 1, wherein the plurality of layers comprise one or more convolution layers.

7. The method of claim 6, further comprising:
    transforming a three-dimensional weight tensor of the convolutional layer to the weight matrix.

8. An apparatus for automatic speech recognition, comprising:
    one or more processors; and
    a memory configured to store instructions executable by the one or more processors;
    wherein the one or more processors, upon execution of the instructions, are configured to:
        receive, by a first layer in a neural network that is executed on the one or more processors, a first input associated with one or more audio feature sequences;
        generate a weight matrix for a layer of a plurality of layers in the neural network, wherein the weight matrix comprises a set of weights associated with the layer, the plurality of layers comprises the first layer receiving a first, and the plurality of layers are executed on the one or more processors;
        divide the weight matrix into a plurality of blocks, each block comprising a plurality of weights, wherein each block has an identical dimension and the identical dimension of each block that is obtained by dividing the weight matrix is determined according to a size of a tensor core unit of the one or more processors;
        determine a pre-determined percentage for each block, wherein the pre-determined percentage is X %, X is a positive integer;

select, based on the pre-determined percentage, a sub-set of weights from the plurality of weights in each block for block-wise pruning, wherein a first ratio of a number of the sub-set of weights in each block to a number of the plurality of weights in each block is X %, wherein the sub-set of weights comprise at least one weight;

set the sub-set of weights in each block to zero to generate a block-wise pruned weight matrix, wherein other weights in each block remain non-zero, wherein a second ratio of a number of the other weights in each block to the number of the plurality of weights in each block is 1-X %; and generating a final output for the one or more audio feature sequences based on the block-wise pruned weight matrix.

9. The apparatus of claim 8, wherein the pre-determined percentage is at least 50%.

10. The apparatus of claim 8, wherein the pre-determined percentage of weights are selected by using a heuristic regularization algorithm.

11. The apparatus of claim 8, wherein the one or more processors are further configured to:
determine, based on a heuristic regularization algorithm, the pre-determined percentage for each block.

12. The apparatus of claim 11, wherein each block has a dimension of 1×4 or 2×2.

13. The apparatus of claim 8, wherein the plurality of layers comprise one or more convolution layers.

14. The apparatus of claim 13, wherein the one or more processors are further configured to:
transform a three-dimensional weight tensor of the convolutional layer to the weight matrix.

15. A non-transitory computer readable storage medium, comprising instructions stored therein, wherein, upon execution of the instructions by one or more processors, the instructions cause the one or more processors to perform acts comprising:
receiving, by a first layer in a neural network that is executed on the one or more processors, a first input associated with one or more audio feature sequences;
generating a weight matrix for a layer of a plurality of layers in the neural network, wherein the weight matrix comprises a set of weights associated with the layer, the plurality of layers comprises the first layer receiving the first input, and the plurality of layers are executed on the one or more processors;
dividing the weight matrix into a plurality of blocks, each block comprising a plurality of weights, wherein each block has an identical dimension and the identical dimension of each block that is obtained by dividing the weight matrix is determined according to a size of a tensor core unit of the one or more processors;
determining a pre-determined percentage for each block, wherein the pre-determined percentage is X %, X is a positive integer;
selecting, based on the pre-determined percentage, a sub-set of weights from the plurality of weights in each block for block-wise pruning, wherein a first ratio of a number of the sub-set of weights in each block to a number of the plurality of weights in each block is X %, wherein the sub-set of weights comprise at least one weight;
setting the sub-set of weights in each block to zero to generate a block-wise pruned weight matrix, wherein other weights in each block remain non-zero, wherein a second ratio of a number of the other weights in each block to the number of the plurality of weights in each block is 1-X %; and
generating a final output for the one or more audio feature sequences based on the block-wise pruned weight matrix.

16. The non-transitory computer readable storage medium of claim 15, wherein the pre-determined percentage is at least 50%.

17. The non-transitory computer readable storage medium of claim 15, wherein the instructions cause the one or more processors to perform acts further comprising:
determining, based on a heuristic regularization algorithm, the pre-determined percentage for each block.

18. The non-transitory computer readable storage medium of claim 17, wherein each block has a dimension of 1×4 or 2×2.

19. The non-transitory computer readable storage medium of claim 15, wherein the plurality of layers comprise one or more convolution layers.

20. The non-transitory computer readable storage medium of claim 15, wherein the instructions cause the one or more processors to perform acts further comprising:
transforming a three-dimensional weight tensor of the convolutional layer to the weight matrix.

* * * * *